(12) United States Patent
Chabaan

(10) Patent No.: US 10,336,204 B2
(45) Date of Patent: Jul. 2, 2019

(54) AUTOMATIC LATERAL ALIGNMENT FOR WIRELESS CHARGING SYSTEMS

(71) Applicants: Hyundai Motor Company, Seoul (KR); Kia Motors Corporation, Seoul (KR)

(72) Inventor: Rakan Chabaan, Farmington Hills, MI (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/790,898

(22) Filed: Oct. 23, 2017

(65) Prior Publication Data

US 2019/0118663 A1    Apr. 25, 2019

(51) Int. Cl.
*B60L 11/18* (2006.01)
*H02K 7/06* (2006.01)

(52) U.S. Cl.
CPC ....... *B60L 11/1829* (2013.01); *B60L 11/1848* (2013.01); *H02K 7/06* (2013.01); *H02K 2201/18* (2013.01)

(58) Field of Classification Search
CPC ..... B60L 11/1848; B60L 11/1829; H02K 7/07
USPC ........................................... 320/108
See application file for complete search history.

(56) References Cited

U.S. PATENT DOCUMENTS

| | | | | |
|---|---|---|---|---|
| 8,884,581 | B2* | 11/2014 | Widmer | B60L 11/182 320/108 |
| 9,024,578 | B2* | 5/2015 | Fisher | H02J 7/0052 320/108 |
| 10,005,368 | B2* | 6/2018 | Caldwell et al. | B60L 11/1829 |
| 2012/0262002 | A1* | 10/2012 | Widmer et al. | B60L 11/1829 307/104 |
| 2014/0197787 | A1 | 7/2014 | Mashinsky et al. | |
| 2016/0347193 | A1* | 12/2016 | Caldwell et al. | B60L 11/1829 |
| 2017/0008409 | A1* | 1/2017 | Roberts et al. | B60L 11/1829 |
| 2017/0136898 | A1* | 5/2017 | Ahmadi et al. | H02J 17/00 |
| 2017/0282732 | A1* | 10/2017 | Lewis et al. | B60L 11/1829 |
| 2017/0361724 | A1* | 12/2017 | Seong et al. | H02J 50/90 |
| 2017/0361725 | A1* | 12/2017 | Seong et al. | H02J 50/90 |

FOREIGN PATENT DOCUMENTS

| CN | 204856221 U | 12/2015 |
|---|---|---|
| DE | 10 2013 103097 A1 | 10/2014 |

* cited by examiner

*Primary Examiner* — Sun J Lin
(74) *Attorney, Agent, or Firm* — Mintz Levin Cohn Ferris Glovsky and Popeo, P.C.; Peter F. Corless

(57) ABSTRACT

A method includes: calculating a wireless power transfer efficiency during a wireless charging session involving a wireless charging assembly having a transmitting coil and an electronic device having a receiving coil mounted to a linear actuator mechanism; and controlling the linear actuator mechanism to move the receiving coil in a lateral direction such that the wireless power transfer efficiency increases.

19 Claims, 6 Drawing Sheets

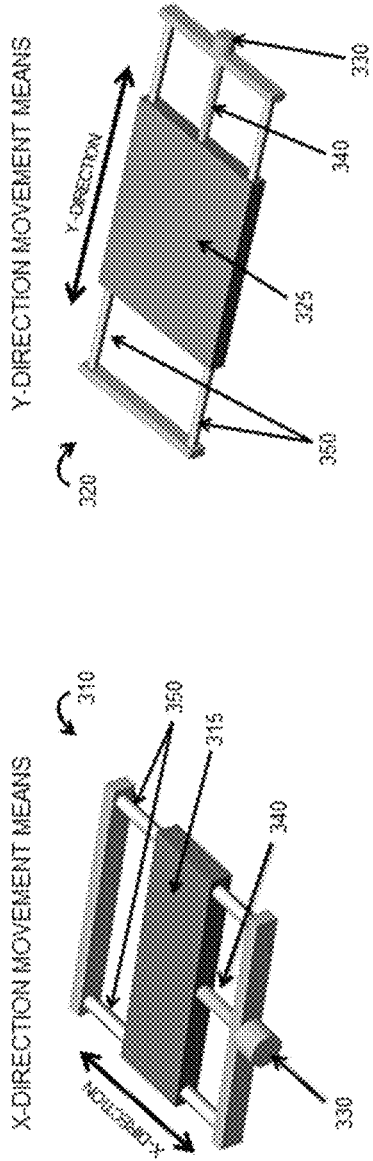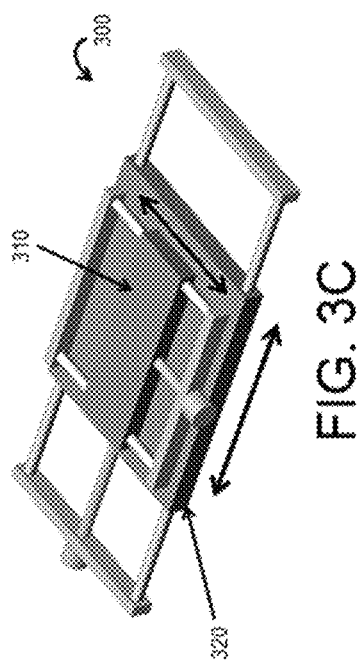
FIG. 3A
FIG. 3B
FIG. 3C

|   | X=-15 | X=-12 | X=-9 | X=-6 | X=-3 | X=0 | X=3 | X=6 | X=9 | X=12 | X=15 |
|---|---|---|---|---|---|---|---|---|---|---|---|
| Y=20 | 87.18 |  |  |  |  | 89.95 |  |  |  |  | 87.18 |
| Y=15 |  | 88.55 |  |  |  | 90.57 |  |  |  | 88.55 |  |
| Y=10 |  |  | 90.13 |  |  | 90.96 |  |  | 90.13 |  |  |
| Y=5 |  |  |  | 90.95 | 91.49 | 91.28 | 91.49 | 90.95 |  |  |  |
| Y=0 | 89.05 | 90.22 | 90.94 | 91.38 | 91.64 | 91.47 | 91.64 | 91.38 | 90.94 | 90.22 | 89.05 |
| Y=-5 |  |  |  | 91.39 | 91.57 | 91.43 | 91.57 | 91.39 |  |  |  |
| Y=-10 |  |  | 90.87 |  |  | 91.32 |  |  | 90.87 |  |  |
| Y=-15 |  | 89.77 |  |  |  | 91.17 |  |  |  | 89.77 |  |
| Y=-20 | 88.61 |  |  |  |  | 90.8 |  |  |  |  | 88.61 |

FIG. 5

AUTOMATIC LATERAL ALIGNMENT FOR WIRELESS CHARGING SYSTEMS

TECHNICAL FIELD

The present disclosure relates generally to techniques for wireless charging, and more particularly, to automatic lateral alignment for wireless charging systems.

BACKGROUND

The development of wireless charging technology has progressed rapidly in recent years. Wireless charging, as opposed to wired charging, improves durability and longevity of the charging components by limiting contact and exposure of the components, increases safety by concealing potentially dangerous wires and connection interfaces, and enhances versatility by allowing charging stations to be implemented in a variety of ways (e.g., as a portable charging pad, embedded in a parking lot or road, etc.).

Wireless charging relies on an electromagnetic field to transfer energy between a charging station (wireless charging assembly) and an electronic device, such as a smart phone, a laptop, an electric vehicle, or the like. Energy is transmitted through an inductive coupling formed between the wireless charging assembly and the device. Typically, an induction coil in the wireless charging assembly (transmitting or primary coil) uses alternating electric current, often provided from the power grid, flowing through the coil to create an alternating electromagnetic field. When an induction coil in the electronic device (receiving or secondary coil) is positioned within the generated electromagnetic field, a current is induced in the coil, and the device converts the induced current into direct current to charge its battery. As a result, the transmitting and receiving induction coils combine to form an electrical transformer, whereby energy can be transferred between the two coils through electromagnetic induction.

A key element of successful wireless energy transfer typically requires that the wireless charging assembly and the electronic device be located within reasonable proximity to one another. With respect to the wireless charging of vehicles, for example, the receiving coil installed in an electric vehicle (EV) or hybrid electric vehicle (HEV) must be satisfactorily aligned with the transmitting coil of the wireless charging assembly in order for the vehicle to be effectively charged. Though recent methods, such as resonant inductive coupling, allow for the wireless charging assembly and electronic device to be spaced further from each other, wireless energy transfer efficiency can suffer if the coils are misaligned, even when using such techniques. Generally speaking, as the transmitting and receiving coils are spaced further apart, and misalignment between the coils increases, energy loss increases, causing charge efficiency to suffer.

SUMMARY

The present disclosure provides techniques which automate a process for reducing lateral misalignment between transmitting and receiving coils in wireless charging systems, thereby increasing the wireless power transfer efficiency during a wireless charging session. A receiving coil installed in a wireless charging-capable electronic device is mounted to a linear actuator mechanism operable to move the receiving coil in one or more lateral directions. The linear actuator mechanism is controlled to move the receiving coil laterally and increase the wireless power transfer efficiency between the receiving coil and the transmitting coil of a wireless charging assembly by reducing the amount of lateral misalignment between the coils.

According to embodiments of the present disclosure, a method includes: calculating a wireless power transfer efficiency during a wireless charging session involving a wireless charging assembly having a transmitting coil and an electronic device having a receiving coil mounted to a linear actuator mechanism; and controlling the linear actuator mechanism to move the receiving coil in a lateral direction such that the wireless power transfer efficiency increases.

The method may further include controlling the linear actuator mechanism to move the receiving coil in at least one of an x-direction and a y-direction such that the wireless power transfer efficiency increases. The linear actuator mechanism may be operable to move the receiving coil in an x-direction and a y-direction.

The calculating of the wireless power transfer efficiency may include: detecting an amount of power transmitted by the transmitting coil and an amount of power received by the receiving coil; and calculating the wireless power transfer efficiency by dividing the amount of power transmitted by the amount of power received by the receiving coil.

The method may further include: receiving an automatic wireless charging alignment signal from a remote device; and in response to receiving the automatic wireless charging alignment signal, controlling the linear actuator mechanism to move the receiving coil in the lateral direction such that the wireless power transfer efficiency increases.

The method may further include: determining whether to move the receiving coil in a first lateral direction or a second lateral direction opposite the first lateral direction; and controlling the linear actuator mechanism to move the receiving coil in the determined lateral direction. In this regard, the method may even further include: calculating a first wireless power transfer efficiency; controlling the linear actuator mechanism to move the receiving coil in the first lateral direction; calculating a second wireless power transfer efficiency after the receiving coil is moved in the first lateral direction; and controlling the linear actuator mechanism to move the receiving coil in the second lateral direction when the second wireless power transfer efficiency is less than the first wireless power transfer efficiency.

The method may further include controlling the linear actuator mechanism to stop moving the receiving coil when the calculated wireless power transfer efficiency satisfies a target wireless power transfer efficiency threshold. In addition, the method may further include controlling the linear actuator mechanism to move the receiving coil in the lateral direction until the calculated wireless power transfer efficiency satisfies a target wireless power transfer efficiency threshold.

The controlling of the linear actuator mechanism may include controlling the linear actuator mechanism to move the receiving coil a predefined distance in the lateral direction. The controlling of the linear actuator mechanism may also include: executing a receiving coil control loop including steps of: controlling the linear actuator mechanism to move the receiving coil a predefined distance in the lateral direction; calculating an updated wireless power transfer efficiency after the receiving coil is moved the predefined distance in the lateral direction; and determining whether the updated wireless power transfer efficiency satisfies a target wireless power transfer efficiency threshold. The receiving coil control loop may be executed until it is determined that the updated wireless power transfer efficiency satisfies the target wireless power transfer efficiency threshold. The controlling of the linear actuator mechanism may even further include: controlling the linear actuator mechanism to move the receiving coil in an x-direction such that the wireless power transfer efficiency increases; and controlling the linear actuator mechanism to move the receiving coil in an y-direction such that the wireless power transfer efficiency increases.

The method may further include: detecting a position of the receiving coil with respect to the transmitting coil using a look-up table; and based on the detected position of the receiving coil, controlling the linear actuator mechanism to move the receiving coil in the lateral direction such that the wireless power transfer efficiency increases.

The electronic device may be a vehicle.

Furthermore, in accordance with embodiments of the present disclosure, a wireless charging-capable electronic device includes: a linear actuator mechanism operable to move in a lateral direction; a receiving coil mounted to the linear actuator mechanism; and a control unit operable to: i) calculate a wireless power transfer efficiency during a wireless charging session involving a wireless charging assembly having a transmitting coil and the electronic device, and ii) control the linear actuator mechanism to move the receiving coil in the lateral direction such that the wireless power transfer efficiency increases.

Furthermore, in accordance with embodiments of the present disclosure, a linear actuator mechanism includes: an x-direction movement means configured to move a receiving coil platform laterally in an x-direction; a y-direction movement means configured to move the receiving coil platform laterally in a y-direction; and one or more motors configured to actuate the x-direction movement means and the y-direction movement means. A receiving coil is mounted to the receiving coil platform, such that actuation of the x-direction movement means causes lateral movement of the receiving coil in the x-direction, and actuation of the y-direction movement means causes lateral movement of the receiving coil in the y-direction.

The x-direction movement means may be mounted on a moving platform of the y-direction movement means, or the y-direction movement means is mounted on a moving platform of the x-direction movement means.

The one or more motors may include a first motor configured to actuate the x-direction movement means and a second motor configured to actuate the y-direction movement means.

The linear actuator mechanism may further include: one or more first support rails on which a moving platform of the x-direction movement means moves laterally in the x-direction; and one or more second support rails on which a moving platform of the y-direction movement means moves laterally in the y-direction. Additionally, the linear actuator mechanism may further include: a first shaft coupled to the one or more motors operable to move the moving platform of the x-direction movement means along the one or more first support rails; and a second shaft coupled to the one or more motors operable to move the moving platform of the y-direction movement means along the one or more second support rails. Also, the receiving coil may be mounted to the moving platform of the x-direction movement means or the moving platform of the y-direction movement means.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3C are illustrations of an example linear actuator mechanism;

FIG. 5 is an example look-up table in the form of a grid including x-y coordinates each associated with a wireless power transfer efficiency value.

Figure 1:
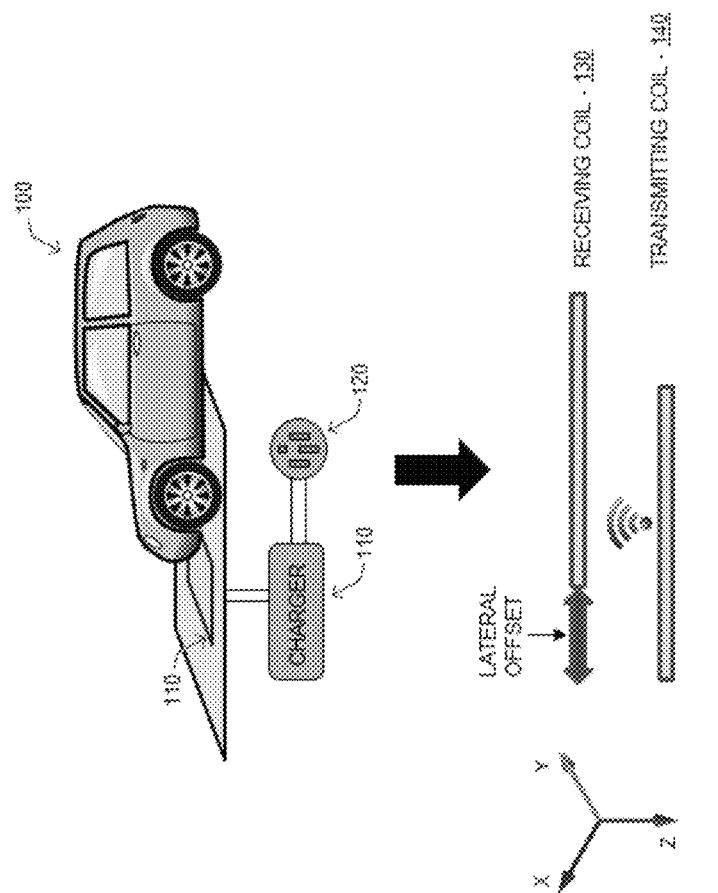
FIG. 1 is an illustration of an example wireless charging-capable vehicle and wireless charging assembly where transmitting and receiving coils are laterally misaligned with one another.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit (or vehicle control unit, e.g., an electronic control unit (ECU) equipped in a vehicle). The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

As would be understood by a person possessing an ordinary level of skill in the art, the terms "wireless charging," "wireless transfer of power," or the like, may refer to the transmission of electrical energy from a power source to an electrical load through free space, without the use of physical conductors, e.g., wires or cables. The power output from a transmitting (or "primary") coil into a field (e.g., a magnetic field, electric field, electromagnetic field, etc.) may be received or captured by a receiving (or "secondary") coil separated by a gap from the transmitting coil to achieve wireless power transfer.

Referring now to embodiments of the present disclosure, the disclosed techniques allow for automatically reducing lateral misalignment between transmitting and receiving coils in wireless charging systems, thereby increasing the wireless power transfer efficiency during a wireless charging session. A receiving coil installed in a wireless charging-capable electronic device is mounted to a linear actuator mechanism that is operable to move the receiving coil in one or more lateral directions, such as an x-direction and a y-direction. The linear actuator mechanism is controlled to move the receiving coil in better alignment with the transmitting coil of a wireless charging assembly, thereby increasing the wireless power transfer efficiency between the transmitting and receiving coils.

FIG. 1 is an illustration of an example wireless charging-capable vehicle and wireless charging assembly where transmitting and receiving coils are laterally misaligned with one another. As shown in FIG. 1, an electrical device (or load) 100 is capable of being wirelessly charged by a wireless charging assembly 110. For demonstration purposes, the electrical device 100 is shown in FIG. 1 as a wireless charging-capable vehicle (e.g., an electric vehicle (EV), hybrid electric vehicle (HEV), etc.) It should be understood that although the electrical device shown in FIG. 1 is a vehicle, the electrical device referred to herein and recited in the present claims is not limited as such. The electrical device may be any wireless charging-capable electrical device.

The wireless charging assembly 110 may embody an induction transmitting coil 140 that uses electric current flowing through the coil to create an electromagnetic field and wirelessly charge the nearby vehicle 100. The wireless charging assembly 110 may be connected to and receive electric current from a local distribution center 120 (e.g., power grid), or any other suitable energy source. For demonstration purposes, the wireless charging assembly 110 is shown in FIG. 1 as an assembly designed for charging a vehicle, though the wireless charging assembly referred to herein and recited in the present claims is not limited as such.

In the example case of an assembly designed for charging a vehicle, the wireless charging assembly 110 may be positioned in any suitable area (e.g., a parking spot in a parking lot, a garage, roadway, etc.) and implemented in any suitable manner, such as a portable charging pad or embedded in or under the ground. The wireless charging assembly 110 may be positioned and implemented such that the vehicle 100 can be driven and/or parked proximate to the wireless charging assembly 110 and wirelessly receive electricity transferred from the charging assembly 110. For instance, the wireless charging assembly 110 may be embodied as a portable charging pad connected to a local power distribution center 120, whereby the vehicle 100 can be driven and/or parked over the charging pad. Alternatively, the wireless charging assembly 110 may be embedded in the ground (partially underground or entirely underground) and connected to the local power distribution center 120, whereby the vehicle 100 can be driven and/or parked over the area of ground in which the wireless charging assembly 110 is embedded. In both cases, or any other suitable case, the vehicle is 100 capable of being driven and/or parked sufficiently proximate to the wireless charging system 110, such that the receiving coil 130 installed in the vehicle 100 is capable of being aligned with the transmitting coil 140 of the charging assembly 110.

The vehicle 100 may wirelessly receive the electrical energy transmitted by the transmitting coil 140 of the charging assembly 110 by way of the inductive receiving coil 130 embodied therein. The receiving coil 130 of the vehicle 100 can wirelessly receive energy transmitted from the transmitting coil 140 of the wireless charging assembly 110 (e.g., via an electromagnetic field generated through an inductive coupling between the coils). Notably, although the present disclosure refers to only a single receiving coil 130 and a single transmitting coil 140, there may be any number of receiving coils 130 and transmitting coils 140 installed in the electrical device and wireless charging assembly, respectively.

During a wireless charging session, the wireless power transfer efficiency between the transmitting coil 140 and receiving coil 130—that is, the fraction of energy transmitted by the transmitting coil 140 that is received by the receiving coil 130—can be affected by several factors, including the degree of lateral alignment (or misalignment) of the coils. Generally, as the transmitting coil 140 and receiving coil 130 are spaced further apart laterally (i.e., in the x- and/or y-direction (not the z-direction)), and misalignment between the coils increases, energy loss increases, causing magnetic flux "leakage" and the wireless power transfer efficiency to suffer. A wireless charging session in which a user wishes for an electrical device to be fully charged will take longer than usual when the coils are misaligned from each other.

In the example shown in FIG. 1, the wireless charging-capable vehicle 100 has parked proximate to the wireless charging assembly 110, but the vehicle 100 is not positioned over the assembly 110 such that the receiving coil 130 is properly aligned with the transmitting coil 140. As shown by the "lateral offset" designated in FIG. 1, the receiving coil 130 is laterally offset from the transmitting coil 140 in the x-direction and/or the y-direction. (The z-direction represents the gap between the coils; thus, lateral misalignment as described herein refers only to displacement in the x- and y-directions.) In the case of the electrical device to be charged being a vehicle, misalignment often results when the driver is unable to locate the wireless charging assembly 110 or the transmitting coil 140 (e.g., due to objects, such as snow, rain, mud, or other objects, obscuring the assembly 110).

Figure 4:
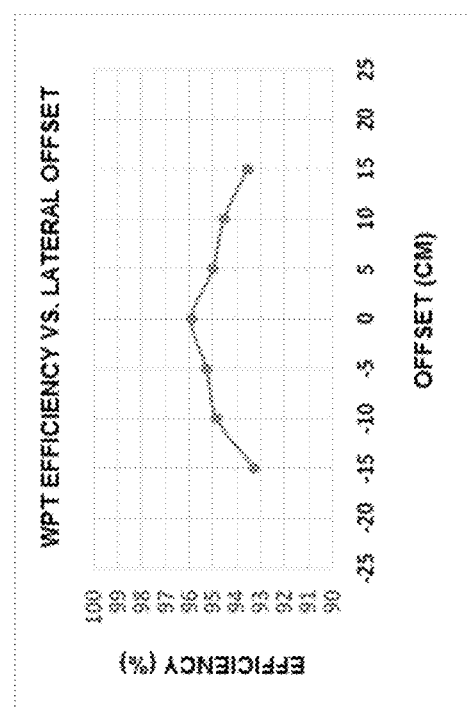
FIG. 4 is a diagram depicting an example correlation between wireless power transfer efficiency and misalignment of transmitting and receiving coils.

To further illustrate, FIG. 4 is a diagram depicting an example correlation between wireless power transfer (WPT) efficiency and misalignment of transmitting and receiving coils. As shown in FIG. 4, wireless power transfer efficiency is maximized when the transmitting and receiving coils are properly aligned—that is, there is no lateral offset in the x- or y-direction between the coils. However, as the lateral offset between the transmitting and receiving coils increases (the offset may be positive or negative), the wireless power transfer efficiency begins to decrease.

Figure 2:
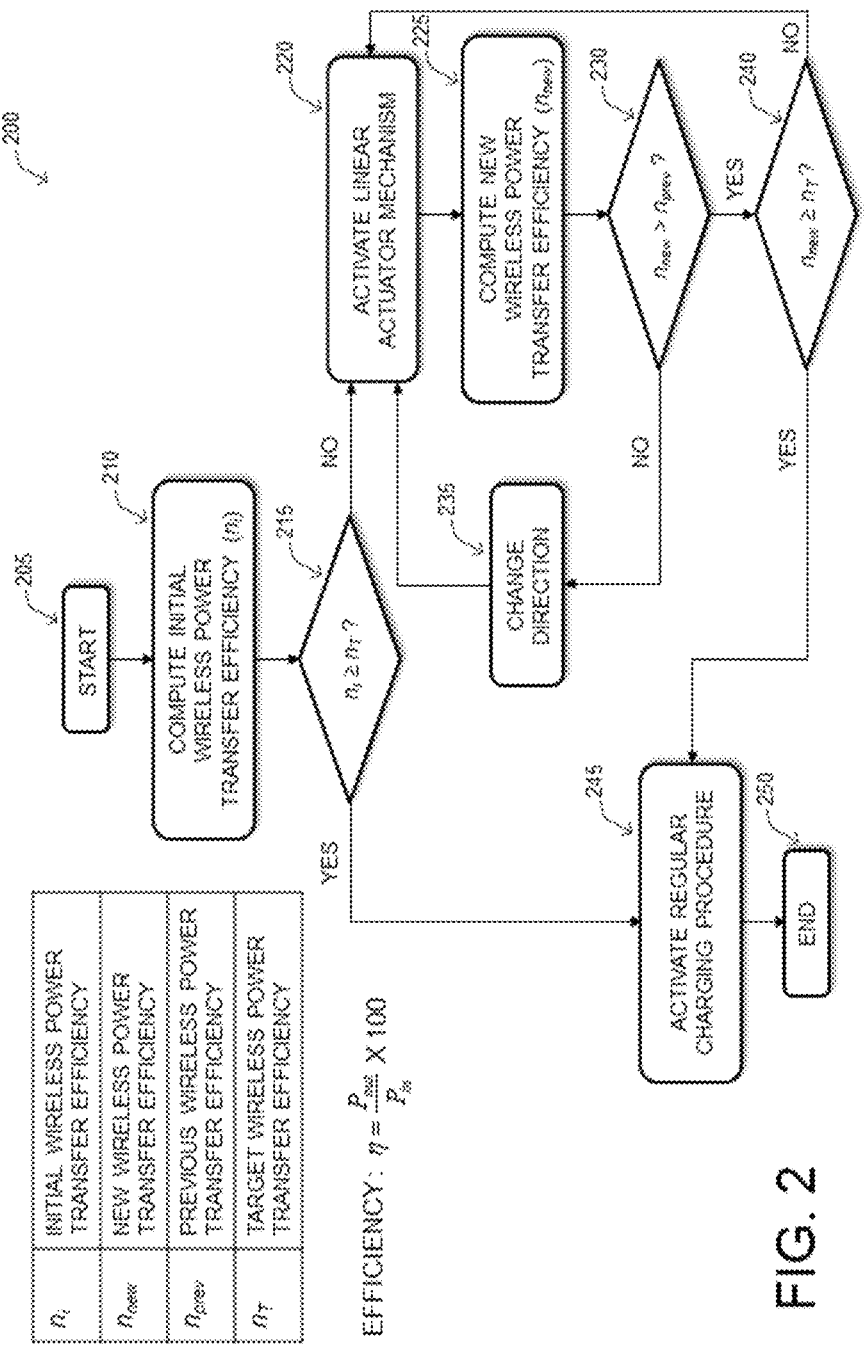
FIG. 2 is a flowchart of an example simplified procedure for automatically aligning transmitting and receiving coils to increase wireless power transfer efficiency.

It is preferable, therefore, for the transmitting and receiving coils to be properly aligned with one another in order to maximize the charging capabilities of the wireless charging assembly 110. To this end, FIG. 2 is a flowchart of an example simplified procedure for automatically aligning transmitting and receiving coils to increase wireless power transfer efficiency. The procedure 200 may start at step 205, and continue to step 210, where, as described in greater detail below, the receiving coil 130 can be mounted to a linear actuator mechanism 300 that moves the receiving coil 130 laterally (i.e., x- and/or y-direction) to increase the wireless power transfer efficiency between the electrical device 100 and the wireless charging assembly 110 by reducing the amount of lateral misalignment between the transmitting and receiving coils. The steps of procedure 200 may be performed by a control unit (not shown) operatively coupled to the linear actuator mechanism 300 and/or the electrical device 100.

At step 205, a wireless charging session may be activated whereby the wireless charging assembly 110 wirelessly transmits energy to the electrical device 100. Energy may be transmitted from the wireless charging assembly 110 in any suitable manner, including a constant transmission of energy or temporary transmission of energy (e.g., energy pulses). In one example, the wireless charging assembly 110 may transmit energy at a maximum power level.

Activation of the procedure 200 may be performed locally at the electrical device 100 and/or wireless charging assembly 110. Alternatively, activation may be performed remotely using, for example, a mobile device (not shown) in communication with the control unit over a network, e.g., a cellular network, a Wi-Fi network, Bluetooth, and the like. In one example, a user may use an application installed on the mobile device to activate the procedure 200.

At step 210, an initial wireless power transfer efficiency ($n_i$) may be computed between the electrical device 100 (e.g., an electric or hybrid electric vehicle) and the wireless charging assembly 110. Upon computing the initial wireless power transfer efficiency ($n_i$), the wireless charging session may be paused, that is, the wireless charging assembly 110 may temporarily cease transmitting power. As an alternative, the power level of the wireless charging assembly 110 may be reduced. As a further alternative, the power level of the wireless charging assembly 110 may be low (e.g., 2.5-3.5 kW) throughout steps 205 to 240, and increased to a high level (e.g., 6-7 kW) upon activation of the regular charging procedure at step 245. It should be noted that the ranges above are provided for the purpose of illustration only, and does not limit the scope of the present disclosure.

The wireless power transfer efficiency is defined as the fraction or percentage of energy transmitted by the wireless charging assembly 110 that is received by the electrical device 100. The initial wireless power transfer efficiency ($n_i$) may be used as a baseline for determining whether to move the receiving coil 130, as well as the direction to move the receiving coil 130, using the linear actuator mechanism 300.

At step 215, it may be determined whether the initial wireless power transfer efficiency ($n_i$) satisfies a predetermined target wireless power transfer efficiency threshold. The wireless power transfer efficiency may be calculated according to Equation 1 shown below:

$$\eta = \frac{P_{out}}{P_{in}} \times 100, \qquad \text{[Equation 1]}$$

where n represents the wireless power transfer efficiency between the wireless charging assembly 110 having the transmitting coil 140 equipped therein and the electrical device 100 having the receiving coil 130 equipped therein, $P_{out}$ represents energy transmitted by the wireless charging assembly 110, and $P_{in}$ represents energy received by the electrical device 100.

If the initial wireless power transfer efficiency ($n_i$) satisfies the predetermined threshold, there is no need to move the receiving coil 130, and the procedure may proceed to step 245 where the regular charging procedure is activated (i.e., the wireless charging assembly 110 wirelessly charges the electrical device 100). In other words, there is no need to adjust the receiving coil 130 to improve the wireless charging transfer efficiency because the transmitting and receiving coils are sufficiently aligned. Conversely, if the initial wireless power transfer efficiency ($n_i$) does not satisfy the predetermined target wireless power transfer efficiency threshold, the procedure may proceed to step 220 where the receiving coil 130 is moved laterally using the linear actuator mechanism 300 to increase the wireless power transfer efficiency.

For the purpose of determining whether the predetermined target wireless power transfer efficiency threshold is satisfied in step 215, the initial wireless power transfer efficiency ($n_i$) may be compared to a target wireless power transfer efficiency ($n_T$). The target wireless power transfer efficiency ($n_T$) may be, but is not limited to, a predetermined percentage (e.g., 95%). The target wireless power transfer efficiency ($n_T$) could also be a predetermined range of percentages. If the initial wireless power transfer efficiency ($n_i$) is greater than or equal to the target wireless power transfer efficiency ($n_T$), the procedure may proceed to step 245 where the regular charging procedure is activated. Conversely, if the initial wireless power transfer efficiency ($n_i$) is less than the target wireless power transfer efficiency ($n_T$), the wireless power transfer efficiency may be considered inadequate to conduct the regular charging procedure. Thus, the procedure may proceed to step 220 where the receiving coil 130 is moved laterally using the linear actuator mechanism 300 to align the transmitting and receiving coils and increase the wireless power transfer efficiency.

At step 220, the linear actuator mechanism 300 may be automatically activated and controlled by the control unit to move in a lateral direction. For the purpose of the present disclosure, the x-direction and y-direction are considered lateral directions, and thus the linear actuator mechanism 300 can move in both the x-direction and the y-direction. The z-direction, as shown in FIG. 1, is not a lateral direction, but instead represents an up-and-down direction between the receiving and transmitting coils.

As described in greater detail with reference to FIG. 3, the receiving coil 130 of the electrical device 100 may be mounted to the linear actuator mechanism 300, such that the linear actuator mechanism 300 can controlled to move the receiving coil 130 in a lateral direction. The linear actuator mechanism 300 may move for a predetermined distance in a lateral direction. For instance, the linear actuator mechanism 300 may move 2 cm in the positive x-direction, and then proceed to step 225. The predetermined distance may be set in any suitable manner to achieve a desired degree of precision and operation time.

In addition, the initial movement of the linear actuator mechanism 300 may be in a predetermined lateral direction, such as the positive x-direction, negative x-direction, positive y-direction, negative y-direction, and so forth. The system may be designed to move the linear actuator mechanism 300 in any number of lateral directions. For example, the linear actuator mechanism 300 may be controlled to move in only two directions, such as the positive and negative x-directions, or the positive and negative y-directions. Or, the linear actuator mechanism 300 may be controlled to move in four directions, such as the positive x-direction, negative x-direction, positive y-direction, and negative y-direction. Also, the linear actuator mechanism 300 could be controlled to move in eight directions, such as (in terms of degrees) 0°, 45°, 90°, 135°, and so forth. The system can be designed to enhance the precision of the linear actuator mechanism 300 movements by increasing the number of directions in which the linear actuator mechanism 300 moves, or to increase simplicity by reducing the number of directions in which the linear actuator mechanism 300 moves. Any one direction may be selected as the default initial movement direction. After movement of the linear actuator mechanism 300, the wireless charging session can be resumed at maximum power.

At step 225, a new wireless power transfer efficiency ($n_{new}$) may be computed between the electrical device 100 and the wireless charging assembly 110. Because the linear actuator mechanism 300 was controlled to move the receiving coil 130 in step 220, thereby changing the degree of alignment between the receiving coil 130 and the transmitting coil 140, the new wireless power transfer efficiency ($n_{new}$) should differ from the initial wireless power transfer efficiency ($n_i$) computed in step 210. The new wireless power transfer efficiency ($n_{new}$) may be calculated according to Equation 1 above.

At step 230, new wireless power transfer efficiency ($n_{new}$) may be compared to the previous wireless power transfer efficiency ($n_{prev}$), which represents the wireless power transfer efficiency most recently calculated prior to the new wireless power transfer efficiency ($n_{new}$) calculated in step 225. If the new wireless power transfer efficiency ($n_{new}$) was calculated in step 225 for the first time, the initial wireless power transfer efficiency ($n_i$) may be considered the previous wireless power transfer efficiency ($n_{prev}$). Otherwise, the most recently calculated new wireless power transfer efficiency ($n_{new}$) prior to the new wireless power transfer efficiency ($n_{new}$) calculated in step 225 may be considered the previous wireless power transfer efficiency ($n_{prev}$). In such a case, the new wireless power transfer efficiency ($n_{new}$) may be set to the previous wireless power transfer efficiency ($n_{prev}$) prior to calculating an updated new wireless power transfer efficiency ($n_{new}$) in step 225, as the updated new wireless power transfer efficiency ($n_{new}$) will replace the previous new wireless power transfer efficiency ($n_{new}$).

If the new wireless power transfer efficiency ($n_{new}$) is greater than the previous wireless power transfer efficiency ($n_{prev}$), the movement of the linear actuator mechanism 300 in step 220 has increased the wireless power transfer efficiency between the electrical device 100 and the wireless charging assembly 110, and thus improved the alignment between the receiving and transmitting coils. This is because as the alignment between the receiving and transmitting coils improve, so too does the wireless power transfer efficiency. In such case, the linear actuator mechanism 300 has moved the receiving coil 130 in the proper direction (i.e., closer to the transmitting coil 140), and the procedure 200 may proceed to step 240.

At step 240, it may be determined whether the new wireless power transfer efficiency ($n_{new}$) satisfies the predetermined target wireless power transfer efficiency threshold. For instance, the new wireless power transfer efficiency ($n_{new}$) may be compared to the target wireless power transfer efficiency ($n_T$) (previously utilized in step 215). As explained above, the target wireless power transfer efficiency ($n_T$) represents an efficiency at which there is no further need to adjust the receiving coil 130 to improve the wireless charging transfer efficiency because the transmitting and receiving coils are sufficiently aligned. The target wireless power transfer efficiency ($n_T$) may be set to any suitable value (or range of values), e.g., 95%.

If the new wireless power transfer efficiency ($n_{new}$) is greater than or equal to the target wireless power transfer efficiency ($n_T$), the procedure may proceed to step 245 where the regular charging procedure is activated (i.e., the wireless charging assembly 110 wirelessly charges the electrical device 100). Thus, there is no need to further move the linear actuator mechanism 300 and the receiving coil 130. On the other hand, if the new wireless power transfer efficiency ($n_{new}$) is less than the target wireless power transfer efficiency ($n_T$), the wireless power transfer efficiency may still be considered inadequate to conduct the regular charging procedure. Thus, the procedure may return to step 220 where the linear actuator mechanism 300 is controlled to again move the receiving coil 130 laterally using to further align the transmitting and receiving coils and increase the wireless power transfer efficiency toward the target wireless power transfer efficiency ($n_T$). Upon returning to step 220, the linear actuator mechanism 300 may move in the same lateral direction as it was moved most recently since the wireless power transfer efficiency is improving (as determined in step 230), indicating that the receiving coil 130 is being moved in the proper direction (i.e., closer to the transmitting coil 140). The linear actuator mechanism 300 may therefore continue to move the receiving coil 130 in the lateral direction until the wireless power transfer efficiency threshold is satisfied.

Conversely, if at step 230 the new wireless power transfer efficiency ($n_{new}$) is less than the previous wireless power transfer efficiency ($n_{prev}$), it may be assumed that the movement of the linear actuator mechanism 300 in step 220 has worsened the alignment between the receiving and transmitting coils. This is because as the alignment between the receiving and transmitting coils worsens, so too does the wireless power transfer efficiency. In such case, the linear actuator mechanism 300 has moved the receiving coil 130 in the improper direction (i.e., further from the transmitting coil 140), and the procedure 200 may proceed to step 235.

At step 235, the direction of movement of the linear actuator mechanism 300 can be changed. Because the previous movement of the linear actuator mechanism 300 worsened the alignment between the receiving and transmitting coils (as determined in step 230), meaning the receiving coil 130 was moved further from the transmitting coil 140, the direction of movement can be altered in order to move the receiving coil 130 closer to the transmitting coil 140 in order to improve alignment between the coils. After changing the direction of movement, the procedure 200 can return to step 220 where the linear actuator mechanism 220 can move the predetermined distance in the changed direction.

In one scenario, the direction of movement of the linear actuator mechanism 300 may be changed to the opposite direction. For instance, if the linear actuator mechanism 300 previously moved the receiving coil 130 in the positive x-direction, and it was determined in step 230 that the new wireless power transfer efficiency ($n_{new}$) is less than the previous wireless power transfer efficiency ($n_{prev}$), the direction of movement of the linear actuator mechanism 300 may be changed to the negative x-direction in step 235. The procedure 200 would then return to step 220 where the linear actuator mechanism 300 may move the predetermined distance in the negative x-direction (i.e., the opposite direction of the previously moved direction).

In another scenario, the direction of movement of the linear actuator mechanism 300 may be changed to a direction along another axis (e.g., from the x-direction to the y-direction). For instance, if the linear actuator mechanism 300 previously moved in both of the positive and negative x-directions, and it was determined in step 240 that the new wireless power transfer efficiency ($n_{new}$) cannot satisfy the predetermined wireless power transfer efficiency threshold (i.e., $n_{new}$ is less than $n_T$), the direction of movement of the linear actuator mechanism 300 may be changed to the y-direction (either positive or negative) in step 235. The procedure 200 would then return to step 220 where the linear actuator mechanism 300 may move the predetermined distance in the y-direction. In such case, the direction of movement has changed from the x-direction to the y-direction in order to move the receiving coil 130 closer to the transmitting coil 140, improving the alignment between the two coils. It should be noted that the two scenarios described above are not limiting, as there may any number of movement directions, and the system may cycle through the various movement directions in any manner suitable for improving the wireless power transfer efficiency.

Upon determining that the wireless power transfer efficiency satisfies the predetermined target wireless power transfer efficiency threshold (e.g., the wireless power transfer efficiency is greater than or equal to the target wireless power transfer efficiency ($n_T$)) at either step 215 or step 240, the procedure 200 may proceed to step 245 where the regular charging procedure is activated, that is, the wireless charging sessions continues until the electrical device 100 is sufficiently charged. It can be seen that the process of steps 220 through 240 (i.e., "receiving coil control loop") may effectively be repeated until the wireless power transfer efficiency is sufficient, resulting in automatic alignment of the receiving coil 130 and transmitting coil 140, at which point the wireless charging assembly 110 wirelessly charges the electrical device 100.

The procedure 200 illustratively ends at step 250. The techniques by which the steps of procedure 200 may be performed, as well as ancillary procedures and parameters, are described in detail above.

It should be noted that the steps shown in FIG. 2 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

In an alternative example, a look-up table can be referenced to determine the position of the receiving coil 130 with respect to the transmitting coil 140. FIG. 5 is an example look-up table in the form of a grid including x-y coordinates each associated with a wireless power transfer efficiency value. The look-up table 500 can be generated prior to usage of the electrical device 100 (e.g., by the manufacturer) by measuring the wireless power transfer efficiency (n) when the receiving coil 130 is positioned at each of a plurality of x-y coordinates. As shown in FIG. 5, the receiving coil 130 and the transmitting coil 140 may be positioned directly over each other (i.e., in alignment) at position (0, 0). Hence, the wireless power transfer efficiency (n) is highest at position (0, 0). The look-up table 500 shows that the wireless power transfer efficiency (n) decreases as the receiving coil 130 moves further from center (0, 0). It should be noted that the measurements shown in FIG. 5 are provided merely for demonstration purposes, and do not necessarily reflect actual measurements. Similarly, the look-up table 500 may be generated in any suitable fashion, and should not be limited to the grid shown in FIG. 5.

After computing the initial wireless power transfer efficiency (n) in step 210, or the new wireless power transfer efficiency ($n_{new}$) in step 225, the look-up table 500 can be used to determine the position of the receiving coil 130 with respect to the transmitting coil 140. For instance, if the computed wireless power transfer efficiency (n) is 90.8, the look-up table 500 can be referenced to quickly determine that the receiving coil 130 is positioned at (0, −20), that is, offset by 20 units in the negative y-direction (the units of measurement may be in centimeters, for example, or any other suitable unit). The computed wireless power transfer efficiency (n) can be compared to the target wireless power transfer efficiency ($n_T$) (e.g., steps 215 or 240), and if the target wireless power transfer efficiency ($n_T$) is not satisfied, the linear actuator mechanism 300 can be activated to move the receiving coil 130 (e.g., step 220), as described above. Notably, because the position of the receiving coil 130 is known to be (0, −20) using the look-up table 500, the linear actuator mechanism 300 can be activated to move 20 units in the positive y-direction, thus aligning the receiving coil 130 with the transmitting coil 140.

In the event that the computed wireless power transfer efficiency (n) is mapped in the look-up table 500 to multiple positions, the linear actuator mechanism 300 can be activated to move a small amount in one direction, and the wireless power transfer efficiency (n) can be re-computed and compared to the previous wireless power transfer efficiency ($n_{prev}$) value (e.g., step 230) to determine whether the linear actuator mechanism 300 is moving in the proper direction, as described above. For instance, if the computed wireless power transfer efficiency (n) is 90.95, the look-up table 500 can be referenced to determine that the receiving coil 130 is positioned at either (6, 10), that is, offset by 10 units in the y-direction and 6 units in the positive x-direction, or (−6, 10), that is, offset by 10 units in the y-direction and 6 units in the negative x-direction, as shown in FIG. 5. In this case, the procedure 200 demonstrated in FIG. 2 may be followed, whereby the linear actuator mechanism 300 is moved in a predetermined initial direction, such as the positive x-direction (e.g., step 220), at which point the new wireless power transfer efficiency ($n_{new}$) can be computed (e.g., step 225) and compared to the previous wireless power transfer efficiency ($n_{prev}$) (e.g., step 230).

If the new wireless power transfer efficiency ($n_{new}$) is greater than the previous wireless power transfer efficiency ($n_{prev}$), the system determines the linear actuator mechanism 300 is moving in the proper direction to align the receiving and transmitting coils, and, using the look-up table 500, can activate the linear actuator mechanism 300 to move the receiving coil 130 to position (0, 0). Conversely, if the new wireless power transfer efficiency ($n_{new}$) is less than the previous wireless power transfer efficiency ($n_{prev}$), the system rev, determines the linear actuator mechanism 300 is not moving in the proper direction to align the receiving and transmitting coils, as described above. Thus, the direction of movement can be changed (e.g., step 235), to the negative x-direction in this case.

Alternatively, if movement in the negative and positive x-directions have been attempted, and neither movement resulted in an increase of the wireless power transfer efficiency (n), movement along another axis, i.e., the y-axis in this case, may be attempted, as described above. Here, using the look-up table 500, the system can determine that if moving the receiving coil 130 in the negative and positive x-directions resulted in a decrease of the wireless power transfer efficiency (n) in both cases, the receiving coil 130 must be positioned on the y-axis with a position of 0 on the x-axis. The linear actuator mechanism 300 can then be activated to move along the y-axis toward (0, 0) to align the receiving coil 130 with the transmitting coil 140.

FIGS. 3A-3C are illustrations of an example linear actuator mechanism. As shown in FIGS. 3A-3C, the linear actuator mechanism 300 includes an x-direction movement means 310 configured to move a receiving coil platform laterally in an x-direction, as well as a y-direction movement means 320 configured to move the receiving coil platform laterally in a y-direction. The linear actuator mechanism 300 may further include one or more motors 330 configured to actuate the x-direction movement means 310 and the y-direction movement means 320. The receiving coil 130 may be mounted on the receiving coil platform (315 or 325). Thus, actuation of the x-direction movement means 310 may cause lateral movement of the receiving coil 130 in the x-direction, and actuation of the y-direction movement means 320 may cause lateral movement of the receiving coil 130 in the y-direction.

The x-direction movement means 310 is illustrated in FIG. 3A; the y-direction movement means 320 is illustrated in FIG. 3B; and the linear actuator mechanism 300 is illustrated in FIG. 3C. The x-direction movement means 310 and the y-direction movement means 320 may include a moving platform 315 and 325, respectively. Each of the moving platforms 315 and 325 may be mounted on one or more support rails 350 and may move laterally along the one or more support rails 350. The one or more motors 330 can actuate the x-direction movement means 310 and the y-direction movement means 320, respectively.

The x-direction movement means 310 and the y-direction movement means 320 may be mounted to each other to form the linear movement actuator 300, as shown in FIG. 3C. To this end, one of the x-direction movement means 310 and the y-direction movement means 320 may be mounted on the moving platform (315 or 325) of the other of the x-direction movement means 310 and the y-direction movement means 320. That is, the x-direction movement means 310 may be mounted on the moving platform 325 of the y-direction movement means 320, or alternatively, the y-direction movement means 320 may be mounted on the moving platform 315 of the x-direction movement means 310. In the example shown in FIG. 3C, the x-direction movement means 310 is mounted to the moving platform 325 of the y-direction movement means 320. Thus, in this example, movement of the moving platform 325 by the y-direction movement means 320 causes movement of the moving platform 315 of the x-direction movement means 310 in the y-direction.

The receiving coil 130 (not shown in FIGS. 3A-3C) may be mounted to a receiving coil platform (i.e., moving platform 315 or 325), such that actuation of the x-direction movement means 310 causes lateral movement of the receiving coil 130 in the x-direction, and actuation of the y-direction movement means 320 causes lateral movement of the receiving coil 130 in the y-direction. For example, one of the x-direction movement means 310 and the y-direction movement means 320 may be mounted on the moving platform (315 or 325) of the other of the x-direction movement means 310 and the y-direction movement means 320, as explained above. The other moving platform (315 or 325), i.e., the moving platform on which the x-direction movement means 310 or the y-direction movement means 320 is not mounted, may receive the receiving coil 130. In the example shown in FIG. 3C, the x-direction movement means 310 is mounted to the moving platform 325 of the y-direction movement means 320, while the receiving coil 130 is mounted to the moving platform 315 of the x-direction movement means 310. As a result, movement of the moving platform 315 by the x-direction movement means 310 may cause movement of the receiving coil 130 in the x-direction, while movement of the moving platform 325 by the y-direction movement means 320 may cause movement of the receiving coil 130 in the y-direction.

The one or more motors 330, which actuate the x-direction movement means 310 and the y-direction movement means 320, may include a first motor configured to actuate the x-direction movement means 310 and a second motor configured to actuate the y-direction movement means 320. The one or more motors 330 may be, for example, an electric direct current (DC) motor, such as a step or stepper motor (though the motors 330 are not limited thereto). Each of the motors 330 may be connected to one or more shafts 340 (e.g., a screw shaft or the like) to control movement of the moving platforms 315 and 325. For instance, a first shaft may be coupled to the first motor to move the moving platform 315 of the x-direction movement means 310 in the x-direction, and a second shaft may be coupled to the second motor to move the moving platform 325 of the y-direction movement means 320 in the y-direction.

The one or more motors 330 and one or more shafts 340 may move the moving platforms 315 and 325 along one or more support rails 350. For instance, the moving platform 315 of the x-direction movement means 310 may move laterally in the x-direction on one or more first support rails, while the moving platform 325 of the y-direction movement means 320 may move laterally in the y-direction on one or more second support rails. Thus, when coupled together, as shown in FIG. 3C, the x-direction movement means 310 and the y-direction movement means 320 enable lateral movement of the moving platforms 315 and 325 in the x-direction and y-direction, respectively, thereby moving the receiving coil 130 laterally in the x-direction and/or y-direction as necessary.

Figure 6:
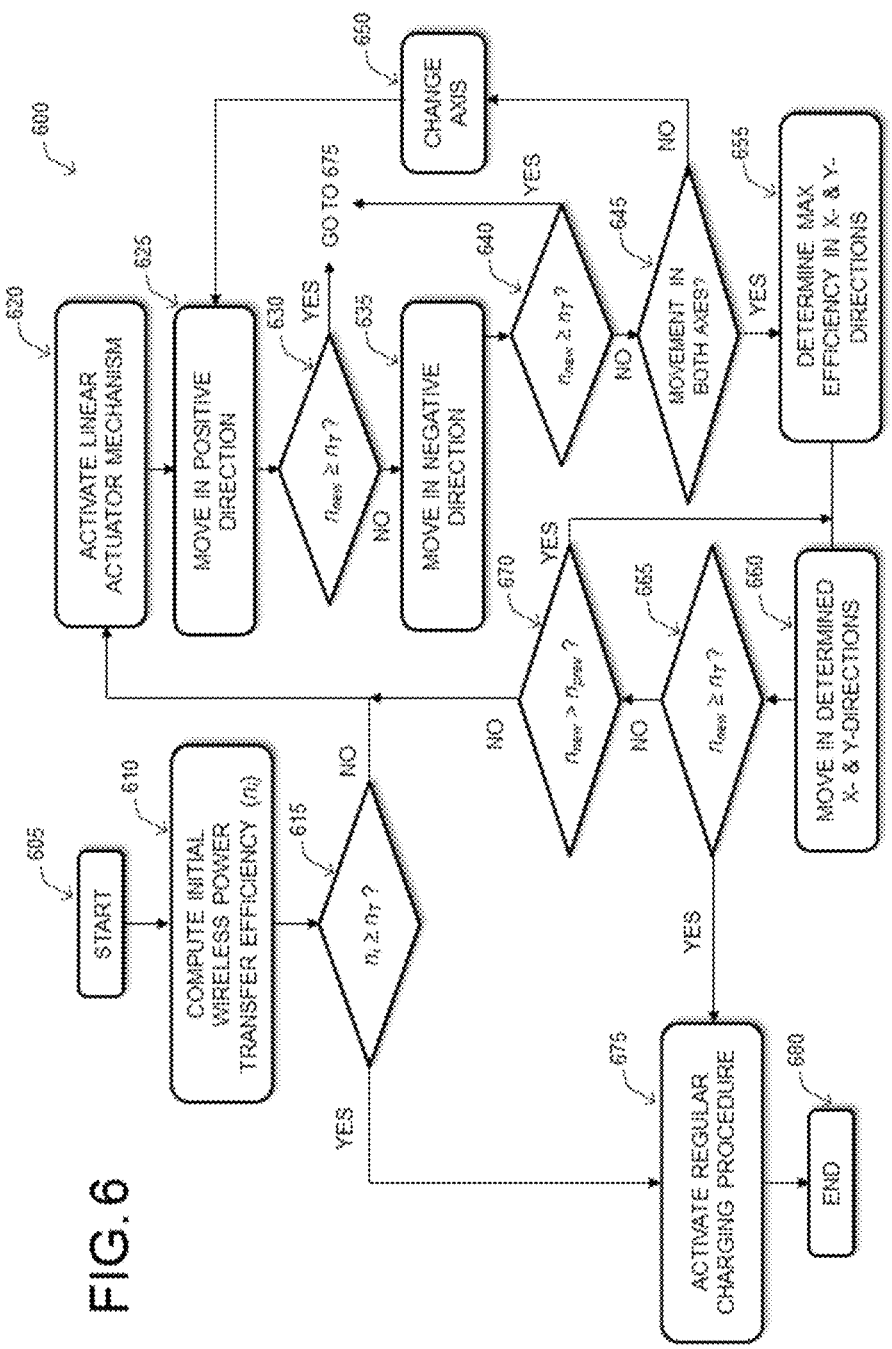
FIG. 6 is a flowchart of another example simplified procedure for automatically aligning transmitting and receiving coils to increase wireless power transfer efficiency.

Additionally, FIG. 6 is a flowchart of another example simplified procedure for automatically aligning transmitting and receiving coils to increase wireless power transfer efficiency. The procedure 600 may start at step 605, and continue to step 610, where, as described in greater detail below, the receiving coil 130 can be mounted to a linear actuator mechanism 300 that moves the receiving coil 130 laterally (i.e., x- and/or y-direction) to increase the wireless power transfer efficiency between the electrical device 100 and the wireless charging assembly 110 by reducing the amount of lateral misalignment between the transmitting and receiving coils.

Steps 610, 615 and 620 of FIG. 6 may correspond to steps 210, 215 and 220 of FIG. 2, respectively. At step 625, the linear actuator mechanism 300 may move the receiving coil 130 a predetermined amount in the positive direction of either the x- or y-axis. For the purpose of demonstration, it can be assumed that the receiving coil 130 is moved in the positive direction along the x-axis. The predetermined amount of movement may preferably be relatively small, such as 1 cm, for example.

At step 630, after movement in the positive direction of the x-axis, a new wireless power transfer efficiency ($n_{new}$) can be calculated (in the manner described above) and stored for reference. If the new wireless power transfer efficiency ($n_{new}$) is greater than or equal to the target wireless power transfer efficiency ($n_T$), the procedure may proceed to step 675 where the regular charging procedure is activated (i.e., the wireless charging assembly 110 wirelessly charges the electrical device 100). Thus, there is no need to further move the linear actuator mechanism 300 and the receiving coil 130.

On the other hand, if the new wireless power transfer efficiency ($n_{new}$) is less than the target wireless power transfer efficiency ($n_T$), the procedure may proceed to step 635. Here, the linear actuator mechanism 300 may return the receiving coil 130 to its original position (prior to the movement in step 625), and move the receiving coil 130 a corresponding predetermined amount in the negative direction of the x-axis.

At step 640, after movement in the negative direction of the x-axis, a new wireless power transfer efficiency ($n_{new}$) can be calculated (in the manner described above) and stored for reference. If the new wireless power transfer efficiency ($n_{new}$) is greater than or equal to the target wireless power transfer efficiency ($n_T$), the procedure may proceed to step 675 where the regular charging procedure is activated (i.e., the wireless charging assembly 110 wirelessly charges the electrical device 100). Thus, there is no need to further move the linear actuator mechanism 300 and the receiving coil 130.

On the other hand, if the new wireless power transfer efficiency ($n_{new}$) is less than the target wireless power transfer efficiency ($n_T$), the procedure may proceed to step 645. Here, if the linear actuator mechanism 300 has not yet moved the receiving coil along both of the x- and y-axes, the axis of movement may be changed at step 650. In the present example, the linear actuator mechanism 300 has not yet moved in the y-axis. Thus, steps 625 to 640 are repeated with movement along the y-axis.

Once the linear actuator mechanism 300 has moved the receiving coil 130 in both axes, the stored efficiency values may be referenced to determine which of the previously attempted directions (i.e., positive x-axis, negative x-axis, positive y-axis, negative y-axis) increased the wireless power transfer efficiency between the electrical device 100 and the wireless charging assembly 110 by reducing the amount of lateral misalignment between the transmitting and receiving coils (step 655). For instance, if the receiving coil 130 is positioned at (−6, 10) (see FIG. 5), it can be determined during steps 625 to 640 that movement of the receiving coil 130 in the positive x-direction and the negative y-direction reduces the amount of lateral misalignment between the transmitting and receiving coils.

In step 660, the linear actuator mechanism 300 may move the receiving coil 130 a predetermined amount in the determined x- and y-directions (positive x-direction and the negative y-direction in this example). For instance, the linear actuator mechanism 300 may move 1 cm in the positive x-direction followed by 1 cm in the negative y-direction. As a result, the receiving coil 130 may effectively move diagonally toward (0, 0) until reaching a position where the wireless power transfer efficiency at such position satisfies the target wireless power transfer efficiency ($n_T$).

Upon determining that the wireless power transfer efficiency satisfies the predetermined target wireless power transfer efficiency threshold (e.g., the wireless power transfer efficiency is greater than or equal to the target wireless power transfer efficiency ($n_T$)) at step 665, the procedure 600 may proceed to step 675 where the regular charging procedure is activated, as described in greater detail above.

The procedure 600 illustratively ends at step 680. The techniques by which the steps of procedure 600 may be performed, as well as ancillary procedures and parameters, are described in detail above.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, techniques are described herein that automate a process for reducing lateral misalignment between transmitting and receiving coils in wireless charging systems, thereby increasing the wireless power transfer efficiency during a wireless charging session. By reducing the misalignment between transmitting and receiving coils, flux leakage can also be reduced, while charging efficiency is improved, resulting faster charging times. Rather than relying on manual adjustment of the electrical device in relation to the wireless charging assembly, automating the misalignment reduction process allows for reliable alignment of the coils even if the wireless charging assembly is obscured by objects such as snow, dirt, leaves, or the like. In addition, the size of the transmitting and receiving coils may be reduced as the charging capabilities of the wireless charging system is maximized through the techniques described herein.

While there have been shown and described illustrative embodiments that provide for automatic lateral alignment of wireless charging systems, it is to be understood that various other adaptations and modifications may be made within the spirit and scope of the embodiments herein. For example, the embodiments have been primarily shown and described herein with relation to an electric or hybrid electric vehicle as the electrical device being charged by the wireless charging assembly. However, the embodiments in their broader sense are not as limited, as the electrical device may constitute any electrical device designed to be wirelessly charged. Furthermore, an example linear actuator mechanism is illustrated in FIGS. 3A-3C. However, the embodiments in their broader sense are not as limited, as the structural composition of the linear actuator mechanism may be modified in any suitable manner consistent with the claims defined herein. Thus, the embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for automatic wireless charging alignment comprising:
    calculating a wireless power transfer efficiency during a wireless charging session involving a wireless charging assembly having a transmitting coil and an electronic device having a receiving coil mounted to a linear actuator mechanism;
    controlling the linear actuator mechanism to move the receiving coil in a lateral direction such that the wireless power transfer efficiency increases;
    determining whether to move the receiving coil in a first lateral direction or a second lateral direction opposite the first lateral direction; and
    controlling the linear actuator mechanism to move the receiving coil in a lateral direction determined in the determining.

2. The method of claim 1, further comprising controlling the linear actuator mechanism to move the receiving coil in at least one of an x-direction and a y-direction such that the wireless power transfer efficiency increases.

3. The method of claim 1, wherein the linear actuator mechanism is operable to move the receiving coil in an x-direction and a y-direction.

4. The method of claim 1, wherein the calculating a wireless power transfer efficiency comprises:
    detecting an amount of power transmitted by the transmitting coil and an amount of power received by the receiving coil; and
    calculating the wireless power transfer efficiency by dividing the amount of power transmitted by the amount of power received.

5. The method of claim 1, further comprising:
    receiving an automatic wireless charging alignment signal from the electronic device from a remote site; and
    in response to receiving the automatic wireless charging alignment signal, controlling the linear actuator mechanism to move the receiving coil in the lateral direction such that the wireless power transfer efficiency increases.

6. The method of claim 1, further comprising:
    calculating a first wireless power transfer efficiency;
    controlling the linear actuator mechanism to move the receiving coil in the first lateral direction;
    calculating a second wireless power transfer efficiency after the receiving coil is moved in the first lateral direction; and
    controlling the linear actuator mechanism to move the receiving coil in the second lateral direction when the second wireless power transfer efficiency is less than the first wireless power transfer efficiency.

7. The method of claim 1, further comprising controlling the linear actuator mechanism to stop moving the receiving coil when the calculated wireless power transfer efficiency satisfies a predetermined target wireless power transfer efficiency threshold.

8. The method of claim 1, further comprising controlling the linear actuator mechanism to move the receiving coil in the lateral direction until the calculated wireless power transfer efficiency satisfies a predetermined target wireless power transfer efficiency threshold.

9. The method of claim 1, wherein the controlling the linear actuator mechanism comprises controlling the linear actuator mechanism to move the receiving coil a predefined distance in the lateral direction.

10. The method of claim 1, wherein the controlling the linear actuator mechanism comprises:
    executing a receiving coil control loop including steps of:
        controlling the linear actuator mechanism to move the receiving coil a predefined distance in the lateral direction;
        calculating an updated wireless power transfer efficiency after the receiving coil is moved the predefined distance in the lateral direction; and
        determining whether the updated wireless power transfer efficiency satisfies a target wireless power transfer efficiency threshold,
    wherein the receiving coil control loop is executed until it is determined that the updated wireless power transfer efficiency satisfies the target wireless power transfer efficiency threshold.

11. The method of claim 1, wherein the controlling the linear actuator mechanism comprises:
    controlling the linear actuator mechanism to move the receiving coil in an x-direction such that the wireless power transfer efficiency increases; and
    controlling the linear actuator mechanism to move the receiving coil in a y-direction such that the wireless power transfer efficiency increases.

12. A method for automatic wireless charging alignment comprising:
    calculating a wireless power transfer efficiency during a wireless charging session involving a wireless charging assembly having a transmitting coil and an electronic device having a receiving coil mounted to a linear actuator mechanism;
    controlling the linear actuator mechanism to move the receiving coil in a lateral direction such that the wireless power transfer efficiency increases;
    detecting a position of the receiving coil with respect to the transmitting coil using a look-up table; and
    based on the detected position of the receiving coil, controlling the linear actuator mechanism to move the receiving coil in the lateral direction such that the wireless power transfer efficiency increases.

13. The method of claim 1, wherein the electronic device is a vehicle.

14. A linear actuator mechanism comprising:
    an x-direction movement means configured to move a receiving coil platform laterally in an x-direction;
    a y-direction movement means configured to move the receiving coil platform laterally in a y-direction; and
    one or more motors configured to actuate the x-direction movement means and the y-direction movement means,
    wherein a receiving coil is mounted on the receiving coil platform, such that actuation of the x-direction movement means causes a lateral movement of the receiving coil in the x-direction, and actuation of the y-direction movement means causes a lateral movement of the receiving coil in the y-direction.

15. The linear actuator mechanism of claim 14, wherein the x-direction movement means is mounted on a moving platform of the y-direction movement means, or the y-direction movement means is mounted on a moving platform of the x-direction movement means.

16. The linear actuator mechanism of claim 14, wherein the one or more motors include a first motor configured to actuate the x-direction movement means and a second motor configured to actuate the y-direction movement means.

17. The linear actuator mechanism of claim 14, further comprising:
   one or more first support rails on which a moving platform of the x-direction movement means moves laterally in the x-direction; and
   one or more second support rails on which a moving platform of the y-direction movement means moves laterally in the y-direction.

18. The linear actuator mechanism of claim 17, further comprising:
   a first shaft coupled to the one or more motors operable to move the moving platform of the x-direction movement means along the one or more first support rails; and
   a second shaft coupled to the one or more motors operable to move the moving platform of the y-direction movement means along the one or more second support rails.

19. The linear actuator mechanism of claim 17, wherein the receiving coil is mounted on the moving platform of the x-direction movement means or the moving platform of the y-direction movement means.

* * * * *